United States Patent [19]

Arvidson, Jr. et al.

[11] 3,939,000

[45] Feb. 17, 1976

[54] FLAT PHOTOGRAPHIC FILM PRODUCED BY HEATING ABOVE THE SECOND ORDER TRANSITION TEMPERATURE OF THE BASE

[75] Inventors: Harold C. Arvidson, Jr., Princeton Junction, N.J.; Quayton Ray Stottlemyer, Wilmington, Del.

[73] Assignee: E. I. Du Pont de Nemours and Company, Wilmington, Del.

[22] Filed: Nov. 21, 1973

[21] Appl. No.: 417,803

[52] U.S. Cl. ................. 96/87 R; 427/171; 427/209; 427/374; 427/385

[51] Int. Cl.$^2$ ....................... G03C 1/80; B29C 25/00

[58] Field of Search ........... 117/34, 62, 47 A, 47 H; 427/374, 378, 384, 385, 171, 172, 173, 209; 96/87 R

[56] References Cited

UNITED STATES PATENTS

| | | | |
|---|---|---|---|
| 2,779,684 | 1/1957 | Alles | 117/34 |
| 3,526,695 | 9/1970 | Spencer | 264/210 |
| 3,565,669 | 2/1971 | McDermott et al. | 117/62 |
| 3,751,280 | 8/1973 | Nerurkar et al. | 427/172 X |
| 3,777,002 | 12/1973 | Suzuki et al. | 117/47 |
| 3,814,617 | 6/1974 | Kasugai et al. | 117/34 |
| 3,834,928 | 9/1974 | Tatsuta et al. | 117/34 |

*Primary Examiner*—Ralph Husack

[57] ABSTRACT

A process for producing flat sheets, particularly photographic sheets for use in automatic film changing equipment, from a stored roll of material. A thermoplastic film is briefly heated to above its second order transition temperature but not over 120° centigrade prior to cutting for packaging. Such heating removes roll curl developed during storage of the film in rolls, without adversely affecting the quality of the film.

8 Claims, 2 Drawing Figures

FLAT PHOTOGRAPHIC FILM PRODUCED BY HEATING ABOVE THE SECOND ORDER TRANSITION TEMPERATURE OF THE BASE

BACKGROUND OF THE INVENTION

1. Field of the Invention

This invention relates to a process for removing roll-set curl from thermoplastic webs, particularly thermoplastic webs used in photographic films. Still more particularly, it relates to a process for removing roll set curl that has developed during storage of photographic film, in rolls, especially medical and industrial x-ray films, prior to cutting into sheets, to provide flat sheets compatible with automatic film changing apparatus.

2. Description of the Prior Art

Curl in finished sheets of industrial and medical X-ray films can be substantially attributed to the storage of photographic material in rolls. The tension and compression of the outer and inner surfaces, respectively, cause elongation and contraction of the surfaces, particularly when the material comprises a substrate with coatings on both sides. Upon unwinding these surfaces do not recover their original size. The problem may be accentuated by hardening of the emulsion and antibrasion layers.

Processes and apparatus for eliminating curl from webs are well known in the web handling art. U.S. Pat. No. 2,658,432 teaches the use of a device for decurling paper webs having spaced ironers and a roll over which the web is looped to bring the web into contact with the ironers and cancel roll-set curl in the web as it passes over the ironers. The device of this patent uses tensioning rolls to increase the decurling action in proportion to the curl of the paper to the web core.

U.S. Pat. No. 3,002,222 teaches heating a thermoplastic web to an empirically determined temperature which renders the film more pliable and applying a reverse curl to remove roll-set curl.

It is well known to remove roll-set curl through the application of reverse curl action with or without heat. The disadvantages in such processes is that the rolls applying the reverse curl often damage the sensitive web surface by introducing scratches, nicks or similar defects incidental to the application of pressure on the surface to generate the reverse curl.

It is also known that heating a thermoplastic material will relieve stresses. Alles, U.S. Pat. No. 2,779,684 teaches a process whereby a polyester film is heat treated to a temperature of 110°C to 150°C for a period of 60 to 300 seconds to produce a film base capable of resisting shrinkage when subsequently exposed to 120°C for a period of up to 5 minutes. Spencer, U.S. Pat. No. 3,526,695 teaches a process where a thermoplastic film is first heated to a temperature of 88°C, to 135° centigrade, and then cooled while supported, to below the second order transition temperature of the base. This treatment reduces corrugation type defects which are generated on the base during manufacturing.

It has now been unexpectedly discovered that heat treating coated or uncoated photographic film base at low temperatures (above the second order transition temperature of the base,) for brief periods of time, e.g., around seven seconds, eliminates, roll-set curl. In the cases where the photographic film base was coated with photosensitive layers, such treatment does not adversely affect the photographic characteristics of the film.

It was further found that subjecting the coated base to 50°C. did not remove curl to any appreciable degree, but increasing the film temperature to just above the second order transition temperature of the base for a brief period and then cutting the web into individual sheets of the commercially desired size and shape, did produce sheets free of roll-set curl.

SUMMARY OF THE INVENTION

It is the object of this invention to provide a useful and practical method to remove curl in films, particularly biaxially oriented polyester film, and more particularly curl resulting from storage in rolls of photographic material, without damaging the quality of such material. Such curl, often referred to as roll-set curl, can be removed by a process comprising briefly heating coated or uncoated base to above its second order transition temperature, but not over 120°C. The heat treatment may be done while the web is stationary or moving through a heating section. The web path can be either straight or curved or even folded, to conserve space. Preferably, heating should not exceed 30 seconds.

The present invention has been found particularly useful in eliminating roll-set curl in photographic material stored in rolls. More particularly this invention was found useful to remove roll-set curl in rolls of photographic material where the coated base was formed from the polyesterification product of a dicarboxylic acid and dihydric alcohol, made according to the teachings of Alles, U.S. Pat. No. 2,779,684 and the patents referred to therein.

The present invention constitutes an improvement over the prior art in that a minimum handling of the sensitive coated area is required, as no reverse curl need be applied. The film can be kept in its original roll form until the time to slit and chop the desired size sheets, so knowledge of the roll's prior history is not required. Decurling occurs as the need arises, and only as much film as is actually needed is unwound from the roll. The requisite equipment is simple and inexpensive. The minimum handling of the surface because of the lack of reverse rolls or tensioning devices greatly reduces damage and improves yields. The temperatures involved are relatively low, heating times short, and no objectionable sensitometric effects have been noted in the processed film. While the preferred embodiment involves treatment of double coated medical X-ray film by unwinding a stored coated roll, heat treating the film and then chopping the film into sheets of desired size, such chopping need not take place immediately following heat treatment. Provided the heat treated product is stored for a short time, insufficient to develop roll-set curl again, the web may be wound up to transport for chopping in a separate location, or for temporary storage.

DESCRIPTION OF THE PREFERRED EMBODIMENTS

While the practice of the invention is particularly useful with respect to double coated industrial and medical x-ray film, it is not intended to be limited only to such films. The method described can be applied to removing roll-set curl in a plurality of situations. Thus the method can be applied to remove roll-set curl from uncoated base of the type mentioned in Alles supra., or from polyethylene terephthalate/isophthalate supports made according to the teachings of British Pat. No. 766,290 and Canadian Pat. No. 562,672, and supports obtainable by condensing terephthalic acid or dimethyl terephthalate with propylene glycol or cyclohexane 1,4-dimethanol (hexahydro-p-xylene alcohol), or any other suitable support having a second order transition temperature. Also such support may be coated on either or both sides, and may have one or more layers. Such layers may be photosensitive layers, or antistatic layers, or coatings to improve the adhesion of subsequent layers on the base or prior layers; and while the preferred embodiment refers to a particular heating means, other heating means may be employed without substantially altering the scope of the invention. If radiant heat is used, it should be such that the radiation will not affect the photographic properties of the film.

Because roll-set curl starts developing as soon as the web is wound up, the cutting operation preferably should follow immediately after removal of roll-set curl by the heat treatment. However, if some curl is acceptable, the cutting may be postponed for a short period which will depend on actual storage conditions of the rewound web. Such period may vary from 12 to 48 hours for polyethylene terephthalate base prepared as in Alles supra, and wound up on mandrels varying in diameter from 6 inches to 20 inches.

In the preferred process, a medical or industrial X-ray film, comprising a polyethylene terephthalate film support, is heated for a period of five seconds to a temperature between 70° to 100°C, and preferably a temperature of 95°C, then cooled to near room temperature and cut into individual sheets of the desired dimensions.

Figure 1:
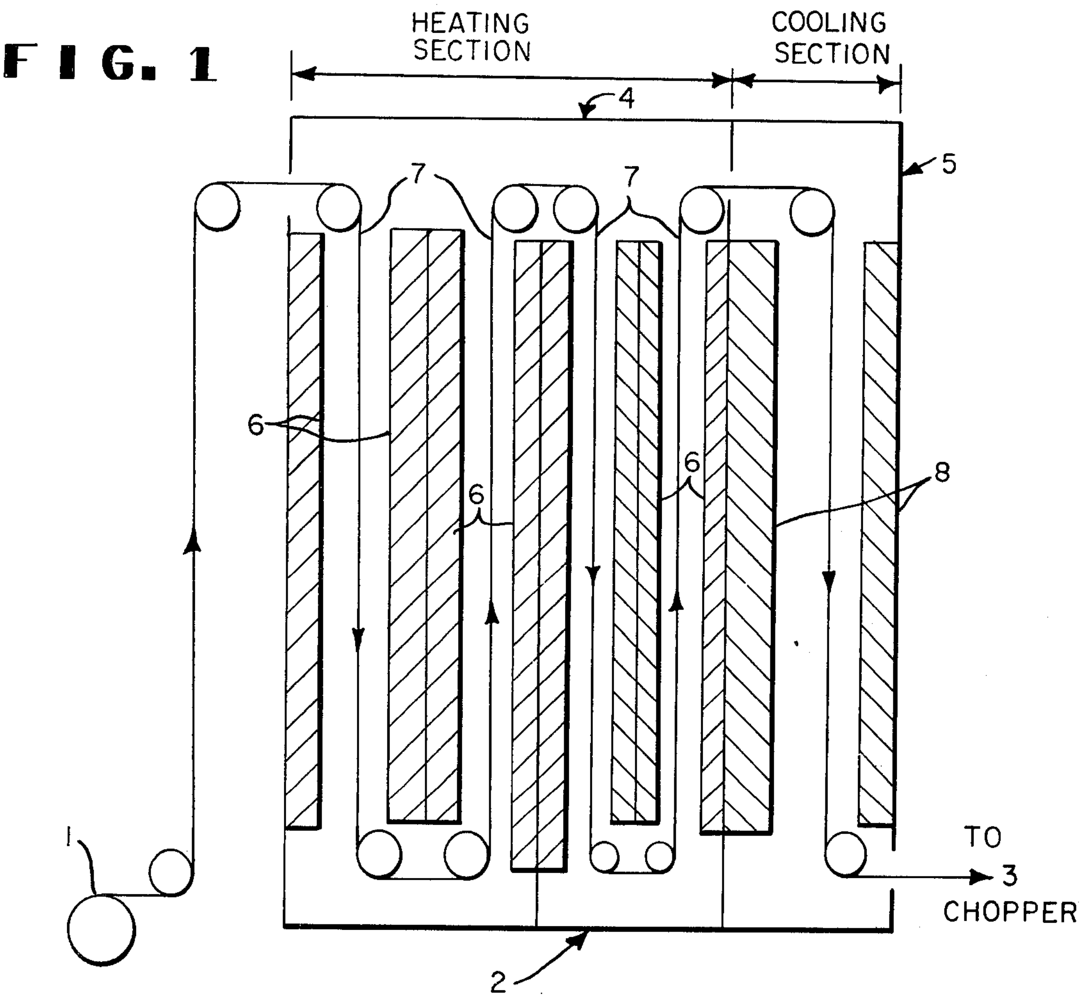
FIG. 1 is a schematic diagram of the preferred process showing the unwinding roll, the heat treating, slitting (optional), and chopping stages.

The preferred process can be better understood with reference to FIG. 1. While FIG. 1 shows a folded path heating section, such is not necessary for the practice of the invention and equally good results will be obtained using a straight through design, as shown in FIG. 2.

A roll of polyester base 1 of the type previously mentioned, coated with an X-ray emulsion of the type described in U.S. Pat. No. 3,063,838 is unwound and directed through a heat treating section 2 to the chopper 3 where it is cut into sheets of the desired size. The heat treating section comprises, a heating 4 and a cooling 5 chambers. Forced hot air plenums 6 direct hot (about 110°C) air onto the web while the web is held substantially flat 7. Residence time of each element of the web in the heating chamber is about 5 seconds. Approximately 2 seconds are used to raise the web temperature above the 2nd order transition temperature to 95°C. The web temperature does not exceed 100°C during the passage. A cooling stage 5 immediately follows the heating stage to rapidly cool the web to near room temperature, prior to chopping. Cooling is done by blowing cold (30°C) air over the web, through appropriately placed plenums 8. The hot and cold chambers are insulated enclosures to permit better control of both the heating and cooling of the web. For a web speed of 320 fpm, 64 feet of travel path within the heating section will suffice. In an embodiment comprising four parallel sections, a heating chamber about 15 feet tall will be required, a size that is quite practical for an industrial installation.

Figure 2:
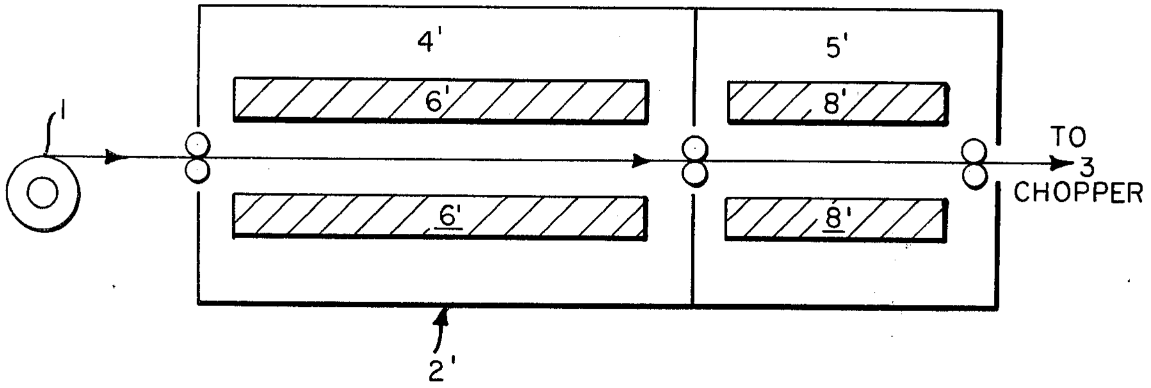
FIG. 2 shows an alternate embodiment using a straight path heating section.

FIG. 2 shows an alternate embodiment employing a straight feed-through path which is equally effective for the practice of this process. Heating 6' and cooling 8' plenums are located in the heating 4' and cooling 5' sections.

The process can be further illustrated with the aid of the following examples. The magnitude of the curl is measured by assuming that the surface is a portion of a right circular cylinder and by determining the radius of curvature of this cylinder in meters. The reciprocal of this radius of curvature (in meters) is the magnitude of the curl in diopters. The term diopter comes from geometrical optics, where it is the unit given to the reciprocal of the focal length of a lens in meters.

To determine the effects of heat on the photosensitive layer of the coated base, samples of a typical medical X-ray film, such as described in Example 1 below, were heat treated in an oven at 100°C, 120°C and 140°C for periods ranging between 10 and 60 seconds. The films were compared with a control sample which was not exposed to any heat and which came out of the same production run as the test samples. Comparison of the sensitometric data as described in Example 1 below showed that there were no adverse effects on the samples treated to 120°C.

In addition to the effects of high temperature on the photosensitive coating, samples of uncoated base were similarly exposed to 100°, 110°, 120° and 130° Centigrade for time intervals of 10, 30, and 60 seconds. The samples were then compared with a control sample for planarity defects by placing them together with the control on a vacuum hold down table, applying vacuum to hold the samples flat, releasing the vacuum to allow the samples to return to their original state and visually checking for the presence of deformations called pucker. All samples exposed to 120° Centigrade and above for periods longer than 30 seconds were judged or unacceptable quality.

To evaluate the effectiveness of the process of this invention in reducing curl, a standardized measurement procedure was established. The sample sheets were suspended with the curl axis vertical, to minimize gravitational effects, and equilibrated for an hour at 25°C and 50–60 percent relative humidity. The curve of the film was then measured with a gauge which had specific radii cut to give various discreet curl levels. The various concave cuts of the gauge were brought in contact with the convex side of the hanging film sheet and the one that best matched the film curvature was noted. Once the radius in meters was determined, curl was calculated using the relation:

$$\text{curl unit} = \frac{1}{\text{radius in meters}}$$

Film temperatures were measured with an Infrared Pyrometer manufactured by Barnes Co. and designated as "Infrared Pyrometer Model IT4-D."

EXAMPLE 1

A medical X-ray film was prepared having both a gelatino-silver iodobromide emulsion layer and an anti-abrasion layer coated on both sides of a 0.007 inch thick polyethylene terephthalate film support. The emulsion layer had a coating weight of 78 to 80 milligrams of silver bromide per square decimeter (78 mg/dm² to 80 mg/dm²), and the antiabrasion layer had a coating weight of 8 to 10 milligrams of gelatin per square decimeter (8 mg/dm² to 10 mg/dm²). The polyethylene terephthalate film support was prepared substantially as taught in Example I of Assignee's Patent to Alles, U.S. Pat. No. 2,627,088. This film has a second order transition temperature of about 70°C. The film was stored in a roll and samples taken had an initial curl of 2. The sample was transported flat at a constant rate of 80 feet per minute (80 ft./min.) through a straight 10 foot long, hot air chamber, resulting in a residence time of 7.5 seconds and then cut into sheets. The hot air temperature was varied to heat the treated film to a number of temperatures. The following results were obtained.

| Film Base Temperature | Curl After Treatment |
|---|---|
| 66°C | 0.50 curl units |
| 77°C | less than 0.50 curl units |
| 94°C | less than 0.50 curl units |

Following treatment samples of both treated and untreated film were exposed and processed under identical conditions.

The film was exposed in a sensitometer according to a procedure based on the "American Method for the Sensitometry of Medical X-ray Films PH 2.9–1956."

The sensitometer used was equipped with a neutral density, $\sqrt{2}$ step wedge. A comparison of the sensitometric data, i.e., speed, gamma, gradient, top density and fog did not show any substantial difference between the controls and test samples.

EXAMPLE 2

A roll of film comprising a 0.004 inch polyethylene terephthalate base coated with a layer of 3.5 mg/dm² resin sub and a layer of 0.75 mg/dm² gelatin sub on both sides, prepared as described in the afore mentioned U.S. Pat. No. 2,627,088 Example No. III, with an initial curl of 7.0 was driven at various speeds through a 10 ft. long straight heating stage having plenums forcing hot air of about 107°C onto the web surface. The following table summarizes the results.

| Web Speed feet/min. | Residence Time Seconds | Surface Temp. of Web°C. | Residual Curl (Curl Units) |
|---|---|---|---|
| 240 | 2.5 | 86° | 2.0 |
| 160 | 3.8 | 87° | 0.5 |
| 80 | 7.5 | 96° | 0.0 |
| 60 | 10 | 90° | 0.0 |

EXAMPLE 3

A sample of medical X-ray film such as described in Example 1 above, was heated by running the web through a heated roller nip. The rollers were maintained at 102°C and the web was driven at 14 feet per minute. The web temperature was raised to 87°C during passage through the nip. Curl was reduced from an original value of 3 to 0.5.

EXAMPLE 4

A sample of a lithographic film prepared substantially as described in Example No. 1 of assignee's U.S.

Pat. No. 3,325,286 issued to R. W. Nottorf, was heat treated in a cabinet oven at 95°C for 60 seconds by placing it flat on the oven floor. Curl was reduced from an original value of 5.0 to 0.

EXAMPLE 5

A sample of a drafting film on 0.007 inch polyester base, prepared substantially as described in Example VI of assignee's U.S. Pat. No. 2,964,423 issued to A. L. Van Stappen, was heat treated as in Example 4 above. Curl was reduced from a value of 19 to 0.75 units.

EXAMPLE 6

A sample of medical X-ray film as described in Example No. 1, but with the silver halide and gel overcoat coated on one side only was heat treated as in Example 4 with the additional restriction that the film sample was held substantially flat during the process. Curl was reduced from 11 to 2.

EXAMPLE 7

A sample of 0.007 inch uncoated polyester film base such as taught in Example I of U.S. Pat. No. 2,779,684, Alles, was heat treated in the oven described in Example No. 1, at a speed of 120 feet/min., corresponding to a residence time of 5 seconds. Film temperature reached 95°C and curl was reduced from 5. to 0.

EXAMPLE 8

A sample of black polyetyhylene terephthalate base prepared substantially as described in Example 7 but to which sufficient carbon black has been added during manufacturing to produce a final product 0.0035 inches thick, having an optical density greater than 8.0, was heat treated in a cabinet oven at 90°C, for 20 seconds. Curl was reduced from an original value of 6 to 0.5.

EXAMPLE 9

An uncoated sample of 0.0058 inches thick cellulose triacetate film base having an initial curl of 8 was heat treated as in Example 8. Curl was reduced to a value of 3. When the oven temperature was raised to 100°C., curl was reduced to 2.5.

The specific examples should not be considered limiting, but illustrative, to better explain the process. Other applications may be developed within changing the scope of the present invention.

What is claimed is:

1. A process for removing curl from a biaxially oriented polyester film coated with at least one photosensitive layer comprising briefly raising the temperature of the film to a temperature which is above its second order transition temperature but not in excess of 120°C.

2. The process of claim 1 wherein the temperature of the film is raised for a period of less than thirty seconds.

3. The process of claim 1 wherein the temperature of the film is raised for a period not in excess of 10 seconds.

4. The process of claim 3 wherein said film is a polyethylene terephthalate film and the film is raised to a temperature of between about 70°C, and about 100°C.

5. The process of claim 3 wherein the film is raised to a temperature of about 95°C.

6. The process of claim 3 wherein the film is a film coated on both sides with a photosensitive layer, and the film is raised to a temperature of about 95°C.

7. The process of claim 3 further comprises rapidly cooling the film after the step or raising the temperature of the film.

8. The process of claim 3 wherein the step of raising the temperature of the film is accomplished by subjecting the film to a stream of forced hot air.

* * * * *